United States Patent [19]

Fujiwara et al.

[11] 4,135,901
[45] Jan. 23, 1979

[54] METHOD OF MANUFACTURING GLASS FOR OPTICAL WAVEGUIDE

[75] Inventors: Kunio Fujiwara; Gotaro Tanaka, both of Yokohama; Shiro Kurosaki, Kamakura, all of Japan

[73] Assignee: Sumitomo Electric Industries, Ltd., Osaka, Japan

[21] Appl. No.: 805,893

[22] Filed: Jun. 13, 1977

Related U.S. Application Data

[63] Continuation of Ser. No. 640,889, Dec. 15, 1975, abandoned.

[30] Foreign Application Priority Data

Dec. 18, 1974 [JP] Japan ................... 49-145338

[51] Int. Cl.² ........................ C03B 37/00; C03C 25/02
[52] U.S. Cl. ............................................ 65/2; 65/3 A; 65/18; 65/DIG. 7; 65/120; 350/96.12
[58] Field of Search .................. 65/3 A, 120, DIG. 7, 65/18, 2, 120; 350/96.12

[56] References Cited

U.S. PATENT DOCUMENTS

| 3,741,796 | 6/1973 | Walker | 65/120 X |
|---|---|---|---|
| 3,826,560 | 7/1974 | Schultz | 65/120 X |
| 3,884,550 | 5/1975 | Maurer et al. | 65/3 A X |
| 3,923,484 | 12/1975 | Randall | 65/120 X |
| 3,957,474 | 5/1976 | Kobayashi et al. | 65/3 A |
| 3,966,446 | 6/1976 | Miller | 65/2 |
| 4,017,288 | 4/1977 | French et al. | 65/3 A X |
| 4,062,665 | 12/1977 | Izawa et al. | 65/3 A |

*Primary Examiner*—S. Leon Bashore
*Assistant Examiner*—Frank W. Miga
*Attorney, Agent, or Firm*—Carothers and Carothers

[57] ABSTRACT

A method of manufacturing glass rod for optical waveguides is proposed. In this method, several gaseous mixtures or powdery mixtures of materials for glass forming are reacted at a high temperature and deposited on the top or end of a rotating glass rod which is initially deposited on a rotating base plate and grown in the form of a rod of a fixed powdery or vitreous state. It is possible to obtain the glass rod having a predetermined radial distribution of index of refraction.

6 Claims, 3 Drawing Figures

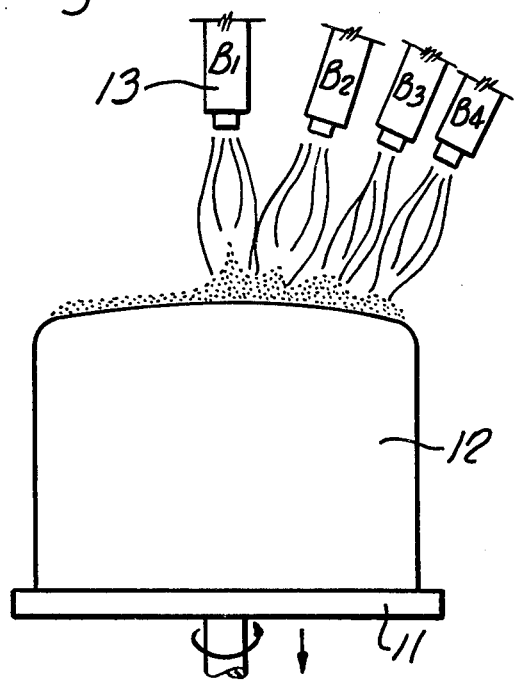
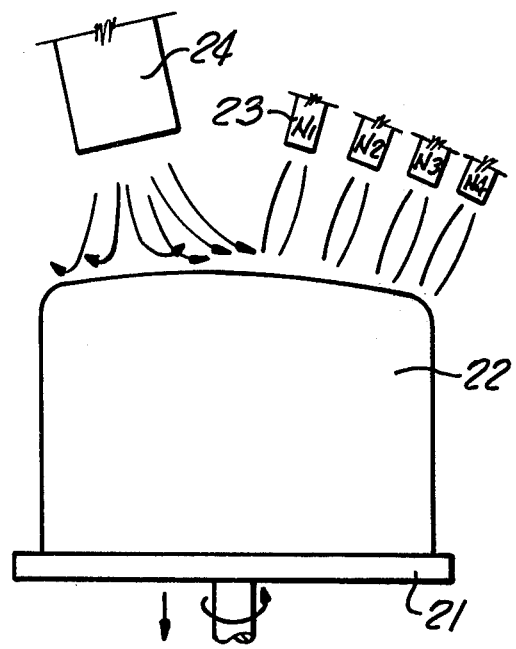
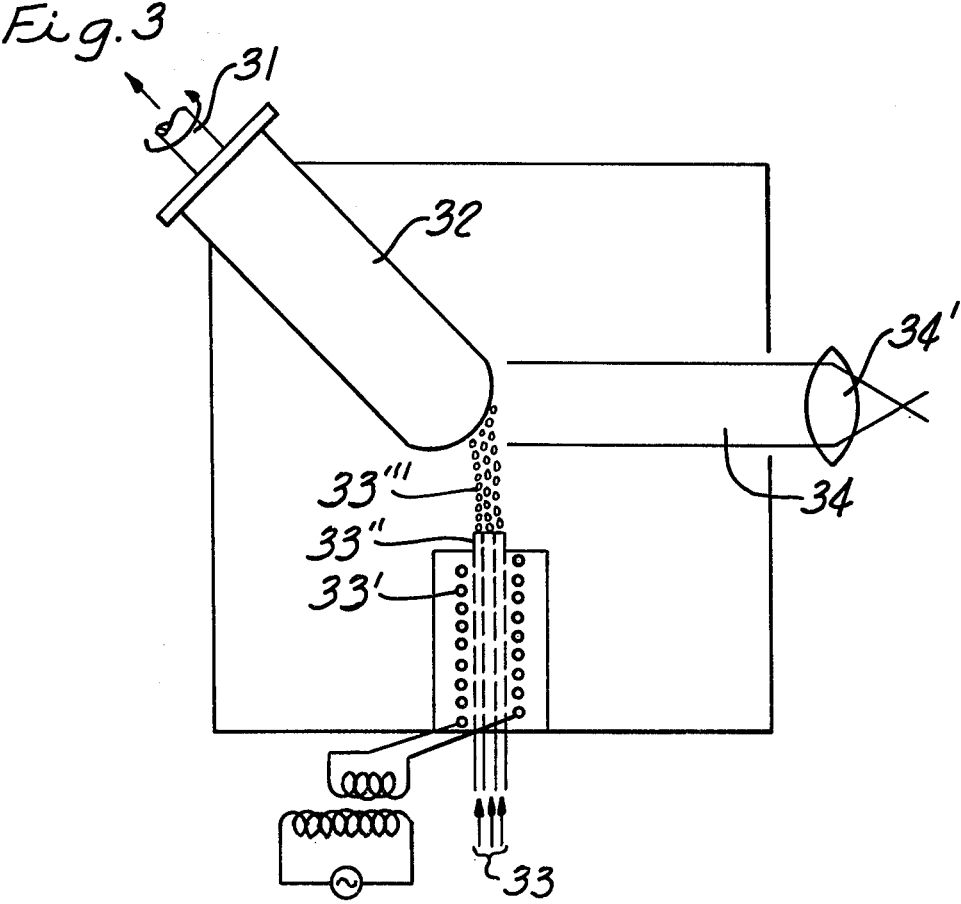

METHOD OF MANUFACTURING GLASS FOR OPTICAL WAVEGUIDE

CROSS REFERENCE TO RELATED APPLICATION

This is a continuation of Application Ser. No. 640,889 filed Dec. 15, 1975 now abandoned.

BACKGROUND OF THE INVENTION (1) Applications of the Invention

This invention relates to a method of manufacturing glass as a material for optical transmission fiber.

(2) Description of the conventional method

The method of manufacturing glass rods of this kind has been known as Bernouilli's Method. In this method, a hydride, halide or oganic compound of Si or other elements are mixed with a gas capable of oxidizing, such as $O_2$. This mixture is fed into the flame of a high frequency plasma torch or oxy-hydrogen burner. When the mixture is heated in the flame, the glass formation takes place. Then, this glass is piled up on the top of a rotating glass rod of $SiO_2$ and other oxides, and a glass rod is thus manufactured.

Processes for making an optical fiber waveguide are briefly described in the following. The shape of the rod is to be determined in accordance with the application of the optical fiber. A rod with uniform distribution of refractive index is inserted into the hollow of the tube which has uniform distribution of refractive index. This composite is heated at the temperature high enough to fuse the composite material. Then the fusing composite is drawn to produce a fine solid fiber for optical waveguides comprising a core with a surrounding clad.

In this method, the manufacturing processes are complicated. The transmission loss of the fibers manufactured in this method is not low enough to satisfy requirements for modern optical communications because undesirable contaminations would be introduced between the rod and the pipe. The defects of the interface between the rod and the tube cause the transmitting light to scatter or to be absorbed mainly by the material located in the interface.

In addition to the disadvantages mentioned above, a fiber having a desired distribution of refractive index in the radial direction cannot be obtained because it is made from a combination of the rod and the tube with uniform refractive index. Furthermore the manufacturing processes are complicated and the final products are expensive compared to those made by the present method. For this reason, the conventional method is not suitable for mass-production.

SUMMARY OF THE INVENTION

This new method was invented in order to improve the shortcomings of the conventional method. Its basic principle consists in producing a glass rod in a vitreous state or a powdery state while rotating it on a base plate. The distribution of the refractive index in the rod can be varied in the radial direction in accordance with a prescribed optimum distribution for the specific application purpose of the optical fiber.

In order to produce such a cylindrical rod, several gaseous mixtures of glass forming compounds and oxydizing gas are fed into a high temperature flame.

Glass is formed through chemical reaction in the mixtures at the prescribed high temperature. The composition of the mixtures to be ejected by the nozzles of the burners varies in the radial direction of the glass rod, resulting in the radial variation of the glass composition. This glass composition is deposited on the top or end of the glass rod while it is rotating around its axis, and which is grown on the rotating base-plate. The top of the rotating glass rod is heated by a clean flame such as plasma or hydro-oxygen or a clean photo-energy source such as a $CO_2$ Laser, or ultraviolet rays, or infrared rays.

The oxydation takes place in the mixtures on the heated top of the glass rod, forming a new glass material to be deposited on the top of the glass rod. This glass is piled up in a vitreous state or in a powdery state on the top of the previously formed glass rod. Thus a glass rod is continuously formed on the base-plate.

The composition of the glass rod is varied in the radial direction.

In the process mentioned above, the material is supplied into or near the torches (or the burners) through the nozzles in the form of a gaseous mixture. Needless to say, however, a liquid or solid or anything else may also be used as such a material insofar as these materials possess the necessary properties and are capable of making glass.

The process mentioned above describes an example where the composite raw materials are supplied by the nozzles above the glass rod. However, their relative position can be changed in accordance with the production convenience. The essential point is that deposition of glass is made on a base-plate to produce a cylindrical glass rod. The distribution of the refractive index is radially varied in the glass rod by means of the locations of the nozzles through which glass materials of different composition are to be supplied.

BRIEF DESCRIPTION OF THE DRAWINGS

FIG. 1 is a diagrammatic side view for explaining an embodiment of the method of the present invention.

FIG. 2 is a diagrammatic side view for explaining another embodiment of the present invention.

FIG. 3 is a diagrammatic side view for explaining still another embodiment of the present invention.

DETAILS OF THE INVENTION

A realization of the first method of this invention is shown in FIG. 1.

In FIG. 1, the base-plate (11) rotates in a direction indicated by the rotational arrow. It also can move down as indicated by the arrow pointing down. Several high-frequency plasma-torch or oxy-hydrogen burners (13) indicated by $B_1$, $B_2$, . . . are installed above the top surface or end of the glass rod (12). Each torch or burner has a nozzle at its axial center. Several mixtures of glass forming compounds and oxygen gas (for example, the mixtures of a halide, a hydride or an organic compound of Si or another element and oxygen gas) are supplied through the nozzles. These gaseous mixtures of glass forming compounds, for example, vapors of $SiCl_4$ and $AlCl_3$, are oxidized in the high temperature region of the flame. This glass is piled up in a vitreous state or in a powdery state upon the glass rod. The base-plate is simultaneously rotated at a constant speed, in such a way that compositions of the glass deposition will vary and give a predetermined distribution of refractive index in the radial direction. The glass rod can also be moved downward as the glass deposition accumulates. In this method, the distances between the tips of the flames and the surface of glass rod are kept constant.

A realization of the second method embodiment of this invention is shown in FIG. 2. The base-plate (21) can move downward at a predetermined speed while rotating at a constant speed as shown by the arrows. The top surface of the base-plate or the glass rod (22) is always heated as by a flame, ultraviolet rays, infrared rays or Laser beams (such as $CO_2$ Laser) as generally indicated at (24) and is kept at a high temperature. The gaseous mixtures of glass forming compounds which are supplied by the nozzles $N_1$, $N_2$ ... are thus heated and oxidized. This oxidized glass are deposited in a vitreous state or in a powdery state on the heated top surface of the rotating base-plate and a glass rod is thereby produced. Different compositions of these compounds are ejected by the nozzles as required. While the glass rod is being produced, the distances between the nozzles and the top surface of the glass rod are kept constant.

Another realization of the method of this invention is shown in FIG. 3. In FIG. 3 a $CO_2$ laser is used as a heater and powders made from gaseous mixtures are used as glass forming materials. The gaseous mixtures (33) of glass forming gas and gas for oxidation are supplied under pressure to the heating zone (33') from sources (33). At the outlet (33'') of the heating zone the mixtures of glass powders (33''') are made and these mixtures are ejected upon the surface of the glass rod (32). The surface of the glass rod is heated by a $CO_2$ Laser beam (34) which projects through a lens (34'). The mixtures of powders are deposited on the end or top surface of the glass rod. In this method the glass rod has a radially varying distribution of composition. Thus the refractive index varies in the radial direction. If halide of Si mixed with other elements and $O_2$ (or $CO_2$) are used as the gaseous mixtures, a glass rod can be obtained with very low OH content in the final product.

As is previously mentioned, it is also possible to first deposit the glass material on the base-plate in the form of powder. After a suitable length of time, the deposit grows into a large cylindrical powder rod. Then this rod is sintered under a suitable environment, for example, oxygen-rich atmosphere at a high temperature, for example 1500° C., for a length of time sufficient to make it vitreous. A rod of glass with a desired distribution of refractive index is thus obtained.

Optical fibers are manufactured by drawing the glass rod at a high temperature in a furnace. Before this drawing process, the glass rod may be cut and ground to obtain round and straight rods.

An example

An example of the realization of this invention is explained in accordance with the manufacturing method shown by FIG. 2.

In FIG. 2, $N_1$, $N_2$, $N_3$ and $N_4$ are the nozzles of silica glass. The inner and outer diameters of the nozzles are 2 mm$\phi$ and 3 mm$\phi$ respectively. These nozzles supply gaseous mixtures composed of ($O_2$, $SiCl_4$ and $GeCl_4$). Each composition of ($O_2$, $SiCl_4$, $GeCl_4$) for nozzles $N_1$, $N_2$, $N_3$ and $N_4$ is fed at a rate respectively as follows:

(200 cc/min, 20 cc/min and 20 cc/min),
(840 cc/min, 48 cc/min and 50 cc/min),
(1000 cc/min, 150 cc/min and 50 cc/min) and
(1400 cc/min, 240 cc/min and 40 cc/min).

A plasma flame of 4 MHZ, 20 KW containing oxygen gas is generated by the high frequency plasma torch of. This flame is applied to the top end of the glass rod (12) opposite to that of the nozzle. The glass composition of $SiO_2$ and $GeO_2$ is varied in the radial direction and are deposited on the top of the cylindrical glass rod at the rate of approximately 1 mm/hr. A glass rod of 50 mm$\phi$ in diameter and 50 mm long is obtained after 50 hours of operation. The optical glass fiber having diameter of 200 $\mu$m$\phi$ is drawn from the glass rod in a high-frequency-electro-magnetic induction furnace at about 2000° C. The optical fiber thus manufactured is found to have good transmission properties of 100 dB/km at $\lambda = 0.63$ $\mu$m and 8 dB/km at $\lambda = 1.05$ $\mu$m.

The method of this invention has the following advantages.

(1) Because the raw materials used are gaseous mixtures of high purity or mixtures of powders of high purity and the reaction and vitrification takes place in clean surroundings at a high temperature, impurity materials can hardly become mixed into the glass rod. Therefore, the transmission loss of the optical fiber can be low compared to that of rods obtained by a conventional method.

(2) The composition of materials to be supplied by each nozzle can be easily controlled, so that a desired variation of the refractive index distribution can be obtained in the radial direction of the optical fiber in accordance with a specific purpose.

(3) The speed of producing the glass rod is regulated by the speed of the descending base-plate, so that the glass rod can be obtained with very uniform quality in the longitudinal direction.

(4) Because most of the materials and the heat supplied by a clean heater are applied directly to the top end surface of the glass rod, the production efficiency is high, resulting in low production cost.

(5) This process is simple and can be easily applied to mass-production of the optical transmission fibers.

(6) Continuous operation for forming the glass rods and drawing the optical fibers is possible.

What we claim is:

1. The method of manufacturing a glass rod with a radially varying refractive index comprising the steps of respectively directing a plurality of streams of glass forming compounds onto a rotating base with said streams positioned at different adjacent radial positions with respect to the central axis of rotation of the base, said glass forming compound streams having predetermined refractive index glass forming compositions, rotating the base about the axis of rotation, heating and oxidizing said streams at a temperature sufficiently high to form a conversion thereof to glass, and continually depositing said glass on said rotating base while retracting said base away from said streams to thereby axially build up a glass rod deposit having a refractive index which varies radially in accordance with the predetermined composition of each respective radially positioned stream and having an axis common to said axis of rotation.

2. The method of claim 1 wherein the glass forming material is a gaseous mixture which is convertible into glass at high temperatures.

3. The method of claim 1 wherein said glass forming material is a powdery mixture convertible into glass at high temperatures.

4. The method of claim 1 wherein the glass deposited on said base surface is in a vitreous state.

5. The method of claim 1 wherein said glass deposited on said base surface is in a powdery state.

6. The method of claim 1 wherein said streams are supplied through a respective plurality of nozzles.

* * * * *